United States Patent
Reynolds et al.

(10) Patent No.: US 6,859,654 B1
(45) Date of Patent: Feb. 22, 2005

(54) METHOD FOR TRANSMITTING MEASUREMENT REPORTS IN A MOBILE COMMUNICATIONS SYSTEM

(75) Inventors: Paul Laurence Reynolds, Wells (GB); Stephen Robert Hope, Cheddar (GB)

(73) Assignee: Orange Personal Communications Services Limited, Bristol (GB)

( * ) Notice: Subject to any disclaimer, the term of this patent is extended or adjusted under 35 U.S.C. 154(b) by 0 days.

(21) Appl. No.: 09/581,457

(22) PCT Filed: Dec. 11, 1998

(86) PCT No.: PCT/GB98/03728
§ 371 (c)(1),
(2), (4) Date: Sep. 11, 2000

(87) PCT Pub. No.: WO99/31918
PCT Pub. Date: Jun. 24, 1999

(30) Foreign Application Priority Data

Dec. 12, 1997 (GB) ............................................. 9726362

(51) Int. Cl.$^7$ ................................................. H04Q 7/20
(52) U.S. Cl. ........................ 455/437; 455/450; 455/525
(58) Field of Search ................................. 455/436, 437, 455/450, 524, 525, 560, 566, 63.1, 67.13, 432.3, 63, 67.3; 370/331, 332

(56) References Cited

U.S. PATENT DOCUMENTS

| | | | |
|---|---|---|---|
| 4,765,753 A | | 8/1988 | Schmidt ..................... 370/332 |
| 5,267,261 A | | 11/1993 | Blakeney, II et al. |
| 5,428,816 A | * | 6/1995 | Barnett et al. ............... 455/437 |
| 5,504,939 A | * | 4/1996 | Mayrand et al. ............. 455/450 |
| 5,594,949 A | * | 1/1997 | Andersson et al. .......... 455/437 |
| 5,657,487 A | * | 8/1997 | Doner ....................... 455/456.2 |
| 5,682,416 A | * | 10/1997 | Schmidt et al. .............. 455/436 |
| 5,822,696 A | * | 10/1998 | Bergkvist .................... 455/436 |
| 5,845,211 A | | 12/1998 | Roach, Jr. ................... 455/436 |
| 5,850,604 A | * | 12/1998 | Dufour et al. ............... 455/435 |
| 5,960,355 A | * | 9/1999 | Ekman et al. ............... 455/456 |

FOREIGN PATENT DOCUMENTS

| | | |
|---|---|---|
| EP | 0 126 557 A1 | 11/1984 |
| EP | 0 851 700 A1 | 7/1998 |
| EP | 0 884 918 A3 | 4/2000 |
| WO | WO 95/17076 | 6/1995 |
| WO | WO 97/36437 | 10/1997 |

OTHER PUBLICATIONS

Mouly, M. et al., GSM System for Mobile Communications, 264–266, 284–287, 420–423 (1993).

\* cited by examiner

*Primary Examiner*—Quochien B. Vuong
(74) *Attorney, Agent, or Firm*—Knobbe Martens Olson & Bear LLP

(57) ABSTRACT

A service node is provided in a mobile communications network which collects radio link measurement reports which are transmitted to the service node by mobile stations. The mobile stations transmit the measurement reports in encapsulated form, in the form of SMS messages, in order to prevent the interception of the measurement report by the serving base station. The service node is able to perform handover decision algorithms using the measurement reports collected from the mobile stations in order to determine appropriate radio access nodes to be allocated to the mobile stations.

18 Claims, 3 Drawing Sheets

METHOD FOR TRANSMITTING MEASUREMENT REPORTS IN A MOBILE COMMUNICATIONS SYSTEM

FIELD OF THE INVENTION

This invention relates to mobile communications, in particular to the transmission of radio resource signalling reports from mobile stations in a cellular communications system, and to the handling thereof within the system.

BACKGROUND OF THE INVENTION

In known mobile communications systems, such as the GSM (Global System for Mobile communications), it is known for mobile stations to take radio link measurements during progress of a call, and to report these measurements to the serving base station. The base scion uses these downlink measurement reports in order to determine when a handover is required.

Handover is initiated by the base station using radio sub-system criteria (signal strength level, link quality, link distance, etc) as well as network directed criteria (e.g. current traffic loading per cell, maintenance requests, etc).

In addition, current networks such as GSM networks include a mobile switching center (MSC), a second generation component in the form of a large, central switch.

Third generation systems are proposed in which various levels of service are provided and in which the MSC functionality is provided in a distributed processing environment, rather than in the form of a central switch.

It would be desirable to provide a more flexible and sophisticated approach to radio resource allocation. It would also be desirable to provide for the re-use of existing mobile network elements, in particular base stations, whilst providing enhanced radio resource signalling functionalities.

SUMMARY OF THE INVENTION

In accordance with one aspect of the invention there is provided a method of transmitting signalling reports from a mobile station to a serving base station in a cellular communications system comprising a network infrastructure and a plurality of base stations connected thereto, said method comprising transmitting radio measurement reports intended for use by said serving base station to allocate a radio resource to said mobile station, and transmitting a radio resource signalling report intended for use by a service node in said network infrastructure to allocate a radio resource to said mobile station.

This aspect of the invention allows radio resources to be allocated by the serving base station when appropriate, whilst also allowing radio resources to be allocated by a service node higher in the network hierarchy in other circumstances. This prevents excessive signalling load in the network, whilst allowing additional parameters not available to the base station to be taken into account when allocating radio resources in these other circumstances.

In accordance with a further aspect of the invention there is provided a method of transmitting signalling reports from a mobile station to a cellular communications system comprising a plurality of base stations including a base station serving said mobile station via a radio link, said method comprising encapsulating a radio resource signalling report before transmission over said radio link, such as to prevent said serving base station from intercepting said radio resource signalling data.

This aspect of the invention provides a method whereby radio resource signalling reports may be transmitted transparently through the serving base station, and onwards to further elements in the system. The encapsulation is preferably by means of a mobile-organizing SMS message, which allows existing radio interface functionality to be used to conceal the radio resource signalling report from the base station.

In accordance with a yet further aspect of the invention there is provided a cellular communications system comprising a plurality of base stations for conducting communications with mobile stations via a radio interface, and a service node for collecting radio resource signalling reports generated by mobile stations when in connected mode in said system, said system comprising means for receiving said reports from said plurality of base stations and for routing same to said service node.

This aspect of the invention provides for the collection and use of radio resource-related data at the service node, to allow radio resource allocation to be conducted by said service node on the basis of such radio resource signalling reports. For example, the service node may perform handover decision algorithms on the basis of the data contained in the radio resource signaling reports, along with other data such as data specifying bandwidth, cost and/or quality of service requirements for the mobile stations.

BRIEF DESCRIPTION OF THE DRAWINGS

Preferred embodiments of the invention will now be described with reference to the accompanying drawings, wherein.

DETAILED DESCRIPTION OF CERTAIN INVENTIVE EMBODIMENTS

Figure 1:
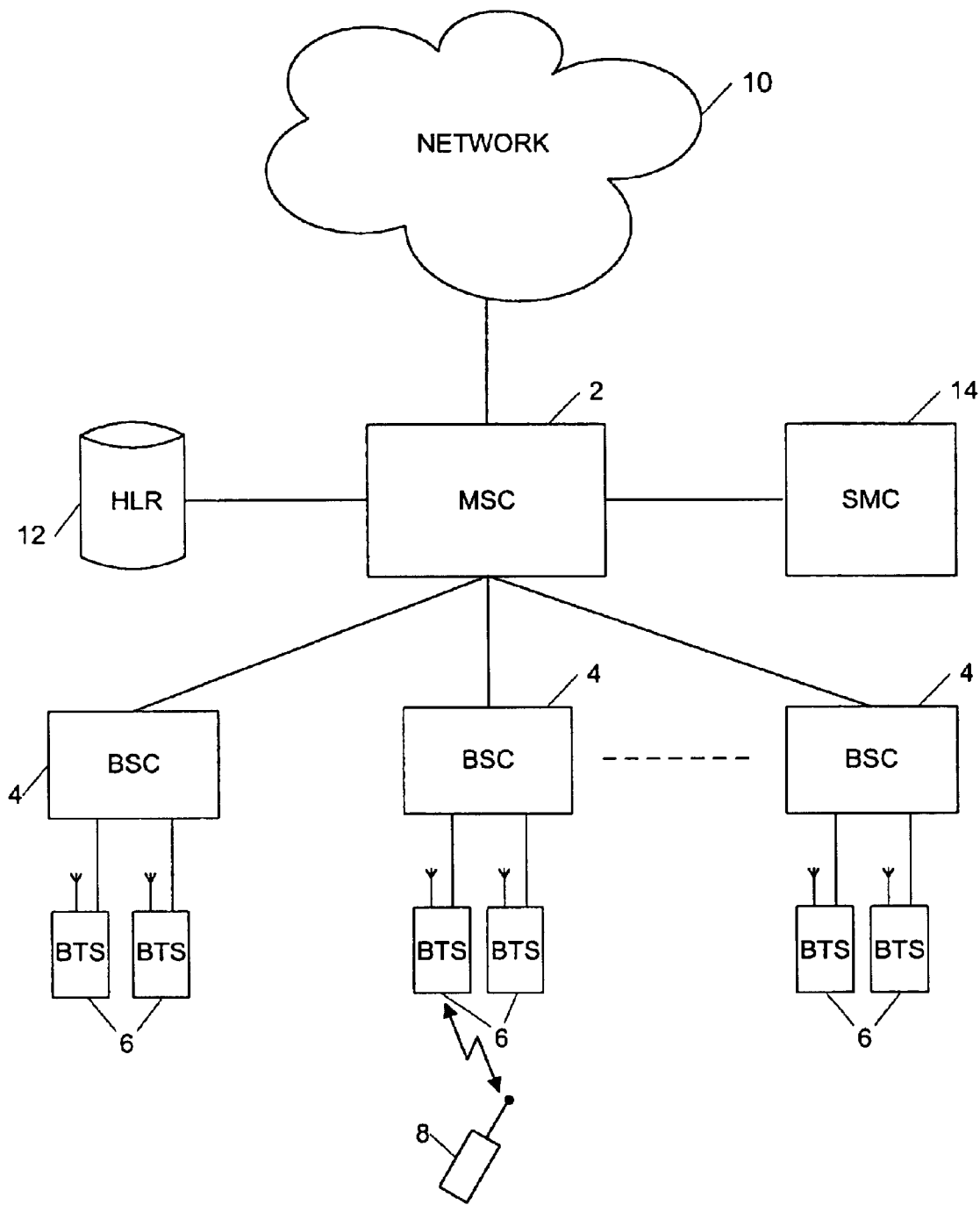
FIG. 1 is a schematic block diagram of a prior art mobile communications network.

A GSM network, referred to as a public land mobile network (PLMN), is schematically illustrated in FIG. 1. This is in itself known and will not be described in detail. A mobile switching centre (MSC) 2 is connected via communication links to a number of base station controller (BSCs) 4. The BSCs 4 are dispersed geographically across areas served by the mobile switching centre 2. Each BSC 4 controls one or more base transceiver stations (BTSs) 6 located remote from, and connected by further communication links to, the BSC. Each BTS 6 transmits radio signals to, and receives radio signals from, mobile stations 8 which are in an area served by that BTS. That area is referred to as a "cell". A GSM network is provided with a large number of such cells, which are ideally contiguous to provide continuous coverage over the whole network territory. Indeed, a number of GSM networks may operate in the same areas to provide overlapping coverage.

The mobile switching centre 2 is also connected via communications links to other mobile switching centres in the remainder of the mobile communications network 10, and to other networks such as a public service telephone network (PSTN), which is not illustrated. The mobile switching centre 2 is provided with a home location register (HLR) 12 which is a database storing subscriber authentication data including the international mobile subscriber identities (IMSIs) which are unique to each mobile station 8. An IMSI consists of a mobile country code (3 decimal digits), a mobile network code (2 decimal digits) and a mobile subscriber code (up to 10 decimal digits) identifying a subscriber within a particular network. The IMSI is also stored in the mobile station in a subscriber identity module (SIM) (to be described below) along with other subscriber-specific information.

The mobile switching centre is also provided with a visitor location register (VLR), not shown, which is a database temporarily storing subscriber authentication data for mobile stations active in its area.

In addition, the MSC is connected to a short message centre (SMC) 14 for handling the transfer of short messages addressed to and from mobile stations within the network. The short message service (SMS) is a point-to-point message service as specified in GSM Technical Specification 03.40. A user of a mobile station 8 may generate a mobile-originating SMS message by input to a Man Machine Interface (MMI) (e.g. a keypad) of the mobile station 8, and transmit the message, along with a destination address, to the servicing BTS 6. The message is forwarded transparently to the MSC 2, which directs the message on to the SMC 14. The SMC 14 generally holds the message and handles the onward transmission to the terminating station corresponding to the directory number specified in the SMS message by the user of the mobile station 8.

When switched on within coverage of the mobile network, the mobile station has two possible modes, namely idle mode and connected mode. Both of these are described in GSM Technical Specification 05.08.

In idle mode, the mobile station 8 measures radio subsystem downlink performance and signal strengths received from surrounding cells. The mobile station 8 selects a preferred cell according to a cell selection algorithm, and informs the network via a signalling channel of its selection. Occasionally, when the mobile station moves to a new cell site, the mobile station transmits a location update to the mobile network via a signalling channel.

When in connected mode, the mobile station 8 initiates a call establishment procedure and is allotted a dedicated channel (a "connection") for the transfer of voice and/or data traffic over the radio interface. Be dedicated channel includes a main traffic channel (TCH) for carrying the voice or data traffic, and a low-rate signalling channel (the Slow Associated Control Channel, SACCH). When in connected mode, the mobile station continuously performs radio measurements from the serving cell BTS and from neighboring cell BTSs. These measurements are regularly reported to the serving cell BTS on the SACCH. The mobile station can report measurements relating to a number of candidate target cells in addition to the measurements relating to the serving cell. These measurements allow the serving BSC to decide when and whereto the handover of a given mobile station in connected mode is to be initiated. The BSC intercepts the measurement reports generated by the mobile station and sent on the SACCH part of the dedicated channel.

It is also possible for the mobile station 8 to send, and receive, short messages (SMS messages) when in connected mode. Such short messages are then sent over the SACCH part of the dedicated channel assigned to the mobile station, and are differentiated from signalling (in particular, the measurement reporting signalling) transmitted over the SACCH by means of a different link identifier (SAPI). The signal 8 messages are allotted SAPI 0, whilst short messages are allotted SAPI 3. The mobile-originating short messages are not intercepted by the BSC, but are transmitted to the MSC, which generally directs the short messages using the destination address in the short message header to the SMC 14.

Figure 3:
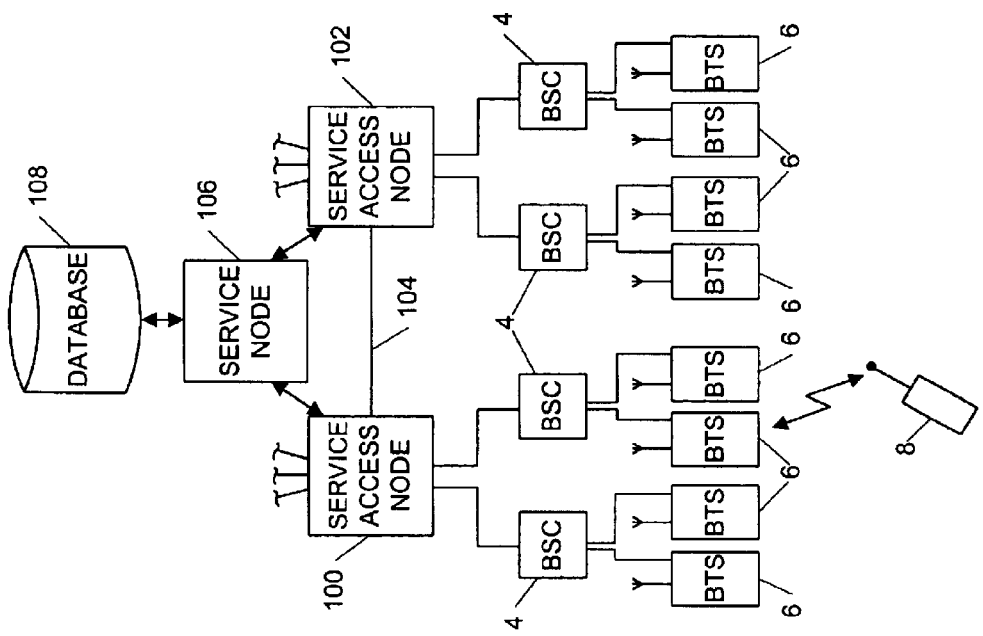
FIG. 3 is a schematic block diagram of a mobile communications system in accordance with the present invention.
Figure 2:
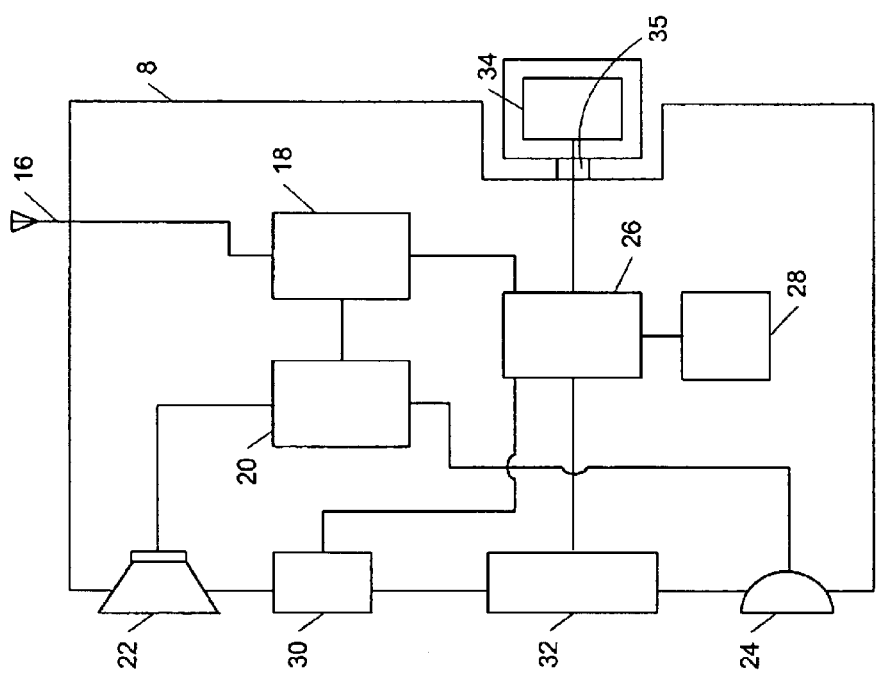
FIG. 2 is a schematic block diagram of a mobile station for use in relation to the present invention.

FIG. 3 schematically illustrates an embodiment of the present invention, in which re-use of GSM-type BSCs 4 and BTSs 6, as well as at least part of the GSM radio interface, is possible, whilst a distributed processing network infrastructure, using intelligent network (IN)-type functionality, replaces the prior art elements associated with and including the MSC 2.

In the arrangement of this embodiment of the invention, the BSCs 4 of one connectivity provider are connected to a first service access node 100, whereas those of a second connectivity provider are connected to a second service access node 102.

Each of the service access nodes 100, 102 have connections to service provision, mobility management, switching and other connection elements, not illustrated. The service access nodes 100, 102 are interconnected using an ATM link 104.

In addition, a service node 106 is connected to each of the service access nodes 100, 102, using signalling links. The service node 106 is provided with a database 108. The service node 106 is adapted to perform predefined handover algorithms in order to make handover decisions based on parameters stored in database 108.

The data stored in database 108 includes, for all currently-active subscribers in each of the areas covered by the two connectivity providers, data relating to the following:

1. Radio link quality. Radio link measurement is performed for the current downlink in the mobile station 8, and for the current uplink in the serving BTS 6. The measurements include, for example, bit error rate, delay, delay jitter, change in quality of service, link loss probability and the time before link loss.

2. A list of target radio access nodes. This is needed to determine the cell to which the radio link should be handed over to. The list is accompanied by information regarding the node capacity and node occupation.

3. Personal subscriber profile and service information, including bandwidth requirements, quality of service requirements, access rights, priority and preference lists, environment selection, provider selection, etc.

4. Operational criteria, which include all the quasi-static parameters (congestion and load control related parameters) required to identify the need for handover.

The mobile station 8 performs radio link measurements for both the servicing cell and the neighbouring cells during connected mode. In addition to the mobile station being adapted for transmitting these measurements in a conventional GSM-type measurement report as signalling on the SACCH to the serving BTS, the mobile station is adapted to encapsulate radio resource measurement reports in short messages which are addressed to the service node 106. The mobile-organizing short message is constructed by the mobile station 8 using an originating address/destination address header combination identifying to the service access node 100 that the short message contains radio link measurement data, instead of a user-defined short message. This ensures that the service access node 100 transmits the measurement report short message to the service node 106, rather than the short message centre (not shown) provided in the intelligent network functionality.

Furthermore, since the measurement report is encapsulated as a short message, the measurement report is not intercepted by the serving BTS/BSC, which would otherwise be the case if the measurement report were transmitted as normal signalling on the SACCH. This takes the decision to attempt a handover out of the sole control of the BSC, and allows handover decisions to be made in the service node 106.

During connected mode, the transmission of measurement reports as normal signalling on the SACCH to the serving BTS/BSC generally occurs continually, such that normal handover decisions may then be made by the BSC 4.

When the mobile station has particular requirements e.g. bandwidth and/or quality of service, the SMS-encapsulated measurement reports arm transmitted by the mobile station instead of, or in addition to, the normal signalling measurement reports, so as to allow radio resource allocation decisions to be made by the service node 106.

The mobile station may be adapted to automatically transmit an SMS-encapsulated measurement report in response to detecting when predetermined service requirement criteria are met (or not met).

Alternatively or in addition, the mobile station may transmit an SMS-encapsulated measurement report on receipt of a request from the service node 106. The service node transmits such a request when other predetermined service requirement criteria are met.

The service node 106 can thus, on receipt of a measurement report, make handover decisions based on parameters not available to the individual BSCs, for example the personal profile and service information.

Figure 4:
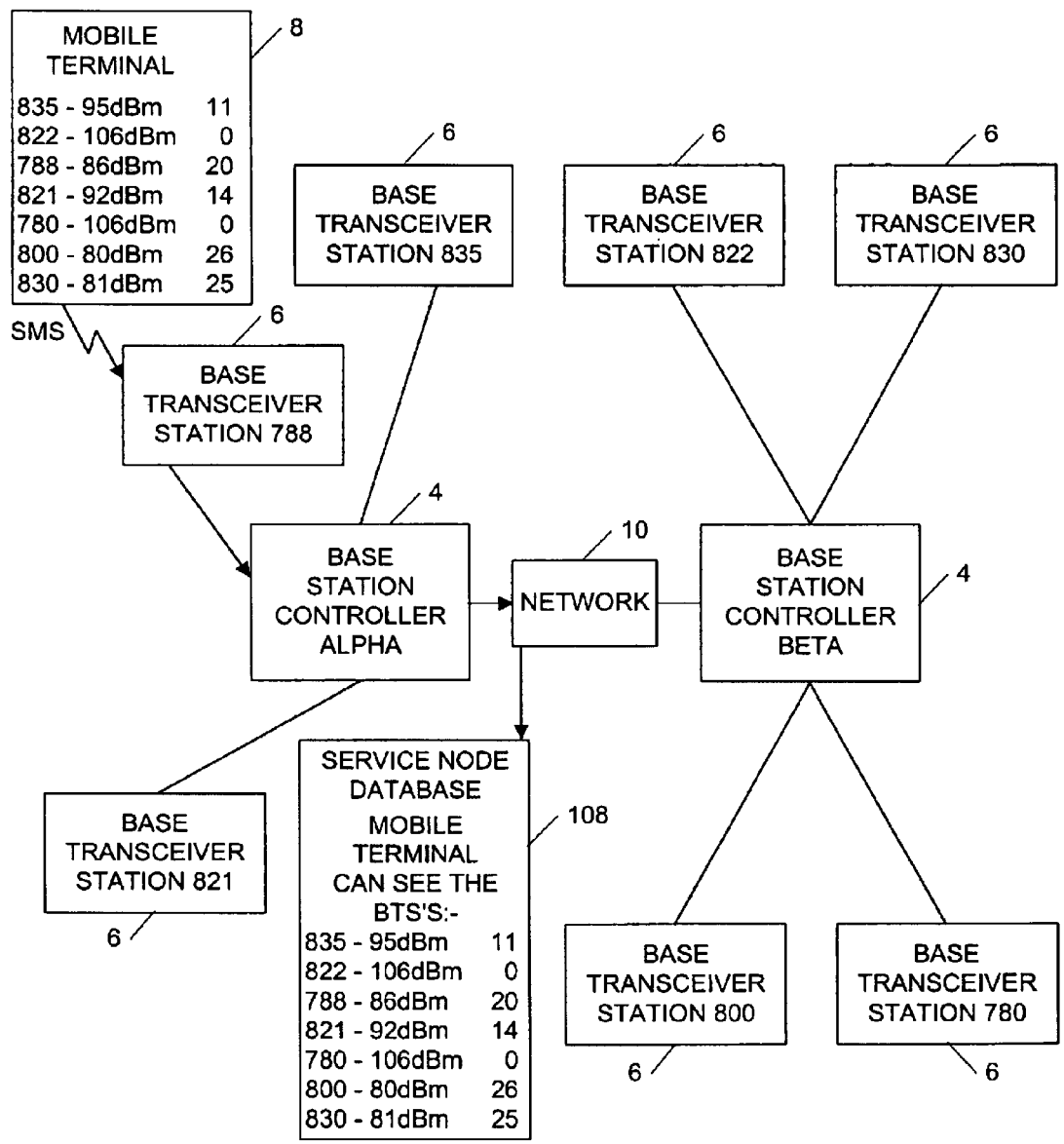
FIG. 4 is a schematic diagram illustrating functionality provided in accordance with the present invention.

FIG. 4 schematically illustrates a situation in which handover between two connectivity providers is possible, and in which the mobile terminal reports basic measurement data to the service node database 108. Mobile terminal 8 is in the vicinity of seven BTSs 6 having frequency channel numbers 835, 822, 788, 821, 780, 800 and 830 respectively. The signal strength measurements (between −106 dBm and −80 dBm) made by the mobile terminal are converted into corresponding quality index numbers (between 0 and 26), and these quality index numbers are encapsulated, along with the Base Station Identification codes and frequency channel numbers, in a mobile-originating SMS message which is transmitted automatically on the SACCH by the mobile terminal 8 to the serving BTS 6. The message is transmitted transparently onwards through the serving BSC 4, into the network, represented by box 110, and into the service node database 108.

The measurement reporting data encapsulated in the short messages is thus sufficient to precisely identify base stations that are visible to the mobile station 8 by means of the base station identification codes, and their associated signal strengths. The service node 106 may decide, on executing a handover algorithm using this measurement data, that a handover should be executed from the serving BTS (frequency channel number 788) belonging to one connectivity provider to a second BTS (frequency channel number 800) belonging to a second connectivity provider. The handover, under instruction from the service node 106, is then performed in the network in accordance with known handover procedures.

A decision to handover a connection may be made based on criteria such as bandwidth (in the case where the mobile station has multiple bandwidth capabilities), quality of service and/or cost associated with each of the different access nodes provided by the connectivity providers. The SMS message may include data relating to the current requirements of the handset and/or the subscriber. For example, the SMS message may include identifiers for preferred connection providers, bandwidth requirements, cost limits, hardware and software version numbers of the handset, etc.

In the example described in relation to FIG. 4, the measurement reports encapsulated in the SMS message contained only radio quality index numbers for each of the BTSs in the vicinity of the mobile station. It is envisaged that other parameters useful for performing handover decisions could also, or alternatively, be encapsulated in the SMS message. For example, the data may include, for the serving cell, the time slot number, the base station colour code, the global cell ID, the receive quality, the receive signal level and/or the number of neighbour cells. Similar data could be provided for each of the neighbour cells, subject to optimisation to minimise signalling load within the network.

A service node is provided in a mobile communications network which collects radio link measurement reports which are transmitted to the service node by mobile stations. The mobile stations transmit the measurement reports in encapsulated form, namely in the form of SMS messages, in order to prevent the interception of the measurement report by the serving base station.

The service node is able to perform handover decision algorithms using the measurement reports collected from the mobile stations in order to determine appropriate radio access nodes to be allocated to the mobile stations.

It is to be mentioned that handover decisions made by the service node 106 need not be initiated only by the service node 106 on receipt of the SMS-encapsulated reports. A handover request may be directed by the mobile station 8 to the service node 106. In this case, when the mobile station initiates the handover request, it encapsulates a measurement report as an SMS message directed at the service node 106, which performs the handover decision algorithm to determine which radio access node would best serve the mobile station.

In the above-described embodiments, the measurement report is encapsulated as a mobile-originating SMS message, to ensure that the measurement report is not intercepted by the serving BTS/BSC. It is envisaged that other modes of encapsulation would also be possible in order to prevent interception of a measurement report by the serving BTS/BSC. For example, the measurement report may be carried using an envelope and/or a message discriminator recognized at the serving BTS/BSC such that the serving BTS/BSC acts as a transparent relay for the measurement report and allowing the measurement report to reach the service node 106. A unique envelope definition could be provided for the encapsulation of such a measurement report which is recognized by the BTS/BSC interface in the network and by the service access node(s), such that it is directed to the service node 106.

Furthermore, the present invention is not limited to the transmission of measurement reports to the service node 106. Alternative radio resource signalling data, for example only user preferences, or user requirements or handover requests alone, could also be encapsulated and sent in a similar manner.

Although a particular mobile station has been described above as an example, the mobile stations may be any or all of:

personal digital assistants,
cellular telephones,
satellite telephones, video phones,
facsimiles,
portable personal computers, etc.

It should be mentioned that the present invention is not limited to arrangements in which GSM-type BSCs and BTSs are re-used. Other cellular network arrangements, in particular third generation systems, would also benefit from use of the present invention.

It is envisaged that further variations and modifications may be employed without departing from the scope of the present invention.

What is claimed is:

1. A cellular communications system comprising:
    a plurality of base stations configured to conduct communications with mobile stations via a radio interface, wherein the mobile stations are used by subscribers;
    a storage system arranged to receive and store first data derived from radio resource signalling reports generated by mobile stations when in connected mode in the cellular communications system, wherein the cellular communications system is arranged to route the radio resource signalling reports from the mobile stations via the plurality of base stations to the storage system, and wherein the storage system is configured to store second data associated with the subscribers; and
    a service node arranged to:
        receive data from the storage system for use in performing handover decisions, wherein the received data includes at least a portion of the first data and at least a portion of the second data;
        process the received data so as to allocate a radio resource to the mobile station, wherein the radio resource is allocated by selecting, from base stations for which radio resource measurements have been received from the mobile station, a base station for handover at least in part on the basis of both the first data and the second data; and
        transmit data identifying the allocated radio resource to at least one of the base stations.

2. The system of claim 1, wherein the data associated with the subscriber includes a personal subscriber profile and/or service information.

3. The system of claim 2, wherein the personal subscriber profile and/or service information includes at least one of bandwidth requirements, quality of service requirements, access rights, priority and preference lists, environment selection, hardware and software version numbers of the associated mobile station, preferred connection providers, and cost limits associated with the subscriber.

4. The system of claim 1, wherein the service node is arranged to request data from the storage system in response to receipt of data from one of the mobile stations.

5. The system of claim 1, wherein the service node is arranged to transmit a resource signalling report request to at least one of the mobile stations.

6. The system of claim 1, wherein the system is arranged to transmit a resource signalling report request to the mobile station in response to a change in service conditions for the mobile station.

7. The system of claim 1, wherein the radio resource signalling reports are encapsulated in the form of an SMS message.

8. The system of claim 7, further comprising means for extracting the radio resource signalling reports from SMS messages received from the mobile stations.

9. The system of claim 1, wherein the radio resource signalling reports comprise data indicative of downlink quality and/or neighbor cell signal strength.

10. The system of claim 1, wherein the radio resource signalling reports comprise data specifying the current requirements of the mobile station.

11. The system of claim 10, wherein the current requirements include at least one of bandwidth, signal-to-noise ratio, radio path loss, cost, and quality of service requirements.

12. The system of claim 10, wherein the current requirements include bandwidth, signal signal-to-noise ratio, radio path loss, cost, and quality of service requirements.

13. A method of allocating radio resources to a mobile station used by a subscriber in a cellular communications system, wherein the cellular communications system comprises a plurality of base stations including a base station serving the mobile station via a radio link, and wherein the cellular communications system has access to stored data for use in performing handover decisions, wherein the stored data includes first data derived from radio resource measurement data for each of a plurality of base stations surrounding the mobile station and second data associated with the subscribers, wherein the second data is different from the first data, the method comprising:
    receiving a handover request in response to conditions satisfying one or more predetermined criteria;
    retrieving at least some of the stored data in response to receipt of the handover request, wherein the retrieved data includes at least a portion of the first data and at least a portion of the second data;
    processing the retrieved data so as to allocate a radio resource to the mobile station, wherein the radio resource is allocated by selecting, from base stations for which radio resource measurement data is included in the stored data, a base station for handover at least in part on the basis of both the first data and the second data; and
    transmitting data identifying the allocated radio resource to at least one of the base stations.

14. The method of claim 13, further comprising transmitting radio resource measurement reports to the cellular communications system and storing data indicative of the same for use in the allocation of radio resources.

15. The method of claim 13, wherein the radio resource measurement reports are transmitted during a dedicated channel traffic connection for the mobile station.

16. A method of allocating radio resources to a mobile station in a cellular communications system, wherein the cellular communications system comprises a plurality of base stations including a base station serving the mobile station via a radio link, and wherein the cellular communications system has access to stored data for use in performing handover decisions, the method comprising:
    receiving a handover request in response to conditions satisfying one or more predetermined criteria, wherein the handover request is encapsulated as an SMS message so as to prevent the serving base station from intercepting the radio resource signalling report;
    retrieving at least some of the stored data in response to receipt of the request;
    processing the retrieved data so as to allocate a radio resource to the mobile station; and
    transmitting data identifying the allocated radio resource to at least one of the base stations.

17. A service node for allocating radio resources to a mobile station used by a subscriber in a cellular communications system, wherein the cellular communications system comprises a network infrastructure and a plurality of base stations for conducting communications with mobile stations via a radio interface, wherein the network infrastructure comprises a storage system arranged to store data for use in performing handover decisions, wherein the storage system is configured to store first data derived from radio resource measurement data for each of a plurality of base stations surrounding the mobile station and second data associated with the subscriber, and wherein the service node is arranged to:

receive data from the storage system for use in performing handover decisions, wherein the received data includes at least a portion of the first data and at least a portion of the second data;

process the received data so as to allocate a radio resource to the mobile station, wherein the radio resource is allocated by selecting, from base stations for which radio resource measurement data is included in said stored data, a base station for handover at least in part on the basis of both the first data and the second data; and transmit data identifying the allocated radio resource to at least one of the base stations.

18. A cellular communications system comprising:

a plurality of base stations configured to conduct communications with mobile stations via a radio interface, wherein the mobile stations are used by subscribers;

a plurality of mobile stations, wherein each mobile station is arranged to generate radio resource measurement reports when in connected mode in the cellular communications system, and wherein the radio resource measurement reports include radio resource measurement data for each of a plurality of base stations surrounding the mobile station;

a storage system arranged to receive and store first data derived from the radio resource measurement data in the radio resource measurement reports generated by mobile stations when in connected mode in the cellular communications system, wherein the cellular communications system is arranged to route the radio resource measurement reports from the mobile stations via the plurality of base stations to the storage system, and wherein the storage system is configured to store second data associated with the subscribers; and a service node arranged to:

receive data from the storage system for use in performing handover decisions, wherein the received data includes at least a portion of the first data and at least a portion of the second data;

process the received data so as to allocate a radio resource to the mobile station, wherein the radio resource is allocated be selecting, from base stations for which radio resource measurements have been received from the mobile station, a base station for handover at least in part on the basis of both the first data and the second data; and transmit data identifying the allocated radio resource to at least one of the base stations.

\* \* \* \* \*